(12) United States Patent
Liu

(10) Patent No.: US 11,589,151 B1
(45) Date of Patent: Feb. 21, 2023

(54) AUDIO DATA COMMUNICATION METHOD AND WIRELESS AUDIO SYSTEM

(71) Applicant: Shanghai WuQi Microelectronics Co., Ltd., Shanghai (CN)

(72) Inventor: Da Liu, Shanghai (CN)

(73) Assignee: Shanghai WuQi Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 17/831,098

(22) Filed: Jun. 2, 2022

Related U.S. Application Data (63) Continuation of application No. 17/684,892, filed on Mar. 2, 2022, now abandoned, which is a
(Continued)

(30) Foreign Application Priority Data

Sep. 24, 2021 (CN) .......................... 202111120602.7

(51) Int. Cl.
H04R 1/10 (2006.01)
H04W 4/80 (2018.01)

(52) U.S. Cl.
CPC ............ H04R 1/1041 (2013.01); H04W 4/80 (2018.02); *H04R 2420/07* (2013.01)

(58) Field of Classification Search
CPC ................................ H04R 1/1041; H04W 4/80
See application file for complete search history.

(56) References Cited

U.S. PATENT DOCUMENTS

2006/0274747 A1* 12/2006 Duchscher ............ H04L 65/613
370/389
2022/0201423 A1* 6/2022 Freda ................ H04W 72/0406
(Continued)

FOREIGN PATENT DOCUMENTS

CN 101233786 B 5/2013
CN 109391876 A 2/2019
(Continued)

OTHER PUBLICATIONS

European Patent Office, Extended European Search Report for Patent Appl. No. EP 21 20 5806.9, dated Apr. 19, 2022, Munich, Germany.

*Primary Examiner* — Simon King
(74) *Attorney, Agent, or Firm* — Amster, Rothstein & Ebenstein LLP (57) ABSTRACT

An audio data communication method and a wireless audio system are disclosed. The audio data communication method is performed by dual-channel wireless audio equipment that includes a primary audio device, a secondary audio device, and a communication link with an audio source device. The method includes transmitting, by the source device, audio data in a preset time interval to the primary and secondary audio devices. The primary and secondary audio devices generate first feedback information and second feedback information. The first and second feedback information are transmitted to the audio source device based on a Carrier Sense Multiple Access/Collision Avoidance protocol. The disclosed techniques address issues such as information interaction between the primary and secondary audio devices during transmission of the feedback information.

13 Claims, 2 Drawing Sheets

Related U.S. Application Data continuation of application No. 17/511,037, filed on Oct. 26, 2021, now abandoned.

(56) References Cited

U.S. PATENT DOCUMENTS

2022/0201757 A1* 6/2022 Cruz .................... H04L 5/0053
2022/0216964 A1* 7/2022 Mondal ................ H04J 11/0053

FOREIGN PATENT DOCUMENTS

| CN | 111031437 A | 4/2020 |
| WO | 2002037754 A2 | 5/2002 |
| WO | 2006133158 A1 | 12/2006 |
| WO | 2021121289 | 6/2021 |

\* cited by examiner

AUDIO DATA COMMUNICATION METHOD AND WIRELESS AUDIO SYSTEM

CROSS-REFERENCE TO RELATED APPLICATION

This application is a continuation of co-pending U.S. application Ser. No. 17/684,892, filed on Mar. 2, 2022, which is a continuation of U.S. application Ser. No. 17/511,037, filed on Oct. 26, 2021, which claims priority, pursuant to 35 U.S.C. § 119, to Chinese Patent Application No. CN 202111120602.7, filed Sep. 24, 2021, the contents of each of which are incorporated herein by reference in their entirety.

FIELD

Embodiments of the present disclosure relate to communication technologies, and more particularly relate to an audio data communication method and a corresponding system.

BACKGROUND

As Bluetooth communication technologies become increasingly mature, audio devices (including sound boxes and headsets) have gained an expeditious evolution from wired to wireless. Among such audio devices, dual-channel (left and right) wireless audio equipment, which features wireless connection, portability, and rich stereo sound-field effect, is popular among consumers and applied more and more extensively.

Owing to characteristics of Bluetooth piconet, a peer-to-peer communication mechanism is mainly adopted between devices. Conventionally, there are two approaches to ensure that both audio devices (one primary and one secondary) in the dual-channel wireless audio equipment can both receive the audio data transmitted by an audio source device. The first approach is that the audio source device first transmits the audio data to the primary audio device, and then the primary audio device transmits the audio data to the secondary audio device; the second approach is that the audio source device first transmits the audio data to the primary audio device, and then the secondary audio device obtains the audio data by sensing a communication link between the audio source device and the primary audio device.

However, besides receiving audio data, the primary audio device and the secondary audio device are both needed to provide to the audio source device a feedback on whether the audio data have been correctly received, such that the audio source device may decide whether to retransmit the audio data or proceed to transmit new audio data based on the feedback information. As the audio source device can only receive the feedback information from one audio device, a conventional practice is to additionally establish a link between the primary audio device and the secondary audio device and leverage one of the audio devices to transmit the feedback information agreed between the peers to the audio source device. However, that practice induces information interaction between the primary audio device and the secondary audio device and causes operation complexity.

SUMMARY

Embodiments of the present disclosure provide an audio data communication method and a wireless audio system, which may effectively resolve information interaction between a primary audio device and a secondary audio device as existent in conventional technologies when transmitting feedback information, thereby ensuring reliability in audio data transmission.

The present disclosure is implemented through the following technical solutions:

an audio data communication method applied to dual-channel wireless audio equipment, the dual-channel wireless audio equipment including a primary audio device and a secondary audio device, a communication link being provided between the primary audio device and an audio source device, wherein the audio data communication method comprises steps of:

transmitting, by the audio source device, audio data in a preset time interval;

receiving, by the primary audio device and the secondary audio device, the audio data, respectively;

generating, by the primary audio device and the secondary audio device, first feedback information and second feedback information based on receipt statuses of the audio data, respectively; and transmitting, by the primary audio device, the first feedback information to the audio source device, or transmitting, by the secondary audio device, the second feedback information to the audio source device, based on the Carrier Sense Multiple Access/Collision Avoidance CSMA/CA protocol.

Preferably, the step of receiving, by the primary audio device and the secondary audio device, the audio data, respectively, comprises:

receiving, by the primary audio device, the audio data via the communication link; and sensing, by the secondary audio device, the communication link to obtain the audio data.

Preferably, the first feedback information includes a first acknowledgement ACK feedback packet and a first negative acknowledgement NACK feedback packet; and in cases of correctly receiving the audio data, the primary audio device generates the first ACK feedback packet, and otherwise, generates the first NACK feedback packet;

the second feedback information includes a second ACK feedback packet and a second NACK feedback packet; and in cases of correctly receiving the audio data, the secondary audio device generates the second ACK feedback packet, and otherwise, generates the second NACK feedback packet.

Preferably, the first ACK feedback packet and the second ACK feedback packet are assigned a same transport priority which is a low transport priority; the first NACK feedback packet and the second NACK feedback packet are assigned a same transport priority which is a high transport priority.

Preferably, the step of transmitting, by the primary audio device, the first feedback information to the audio source device, or transmitting, by the secondary audio device, the second feedback information to the audio source device, based on Carrier Sense Multiple Access/Collision Avoidance CSMA/CA protocol, comprises:

establishing a feedback channel for the primary audio device and the secondary audio device;

contending, by the primary audio device and the secondary audio device, for the feedback channel based on the CSMA/CA protocol in accordance with the transport priorities corresponding to the first feedback information and the second feedback information, thereby obtaining an access right to the feedback channel; and accessing, by the primary audio device, the feedback channel based on the access right to the feedback channel so as to transmit the first feedback information to the audio source device, or accessing, by the secondary audio device, the feedback channel based on the access right to the feedback channel so as to transmit the second feedback information to the audio source device.

Preferably, the preset time interval includes a data processing time interval and an idle time interval;

in the data processing time interval, the audio source device transmits the audio data, and the primary audio device and the secondary audio device receive the audio data and generate the first feedback information and the second feedback information, respectively;

and in the idle time interval, the primary audio device and the secondary audio device contend to access the feedback channel.

Preferably, before executing the step of contending, by the primary audio device and the secondary audio device, for the feedback channel so as to obtain an access right to the feedback channel, the audio data communication method further comprises steps of:

dividing the idle time interval into a short inter-frame spacing, a long inter-frame spacing, and a contention window; and dividing the contention window into at least two back-off timeslots.

Preferably, in cases that the first feedback information refers to the first NACK feedback packet with a high transport priority and the second feedback information refers to the second ACK feedback packet with a low transport priority, the primary audio device obtains a first access right to the feedback channel;

in cases that the first feedback information refers to the first ACK feedback packet with a low transport priority and the second feedback information refers to the second NACK feedback packet with a high transport priority, the secondary audio device obtains the first access right to the feedback channel; and in cases that the first feedback information refers to the first NACK feedback packet with a high transport priority and the second feedback information refers to the second NACK feedback with a high transport priority, the primary audio device and the secondary audio device contend for the first access right by colliding.

Preferably, the primary audio device obtaining the first access right to the feedback channel accesses the feedback channel upon termination of the short inter-frame spacing so as to transmit the first NACK feedback packet to the audio source device in the next preset time interval, such that the audio source device retransmits the audio data;

or, the secondary audio device obtaining the first access right to the feedback channel accesses the feedback channel upon termination of the short inter-frame spacing so as to transmit the second NACK feedback packet to the audio source device in the next preset time interval, such that the audio source device retransmits the audio data.

Preferably, in cases that the first feedback information refers to the first ACK feedback packet with a low transport priority and the second feedback information refers to the second ACK feedback packet with a low transport priority, the primary audio device and the secondary audio device contend for a first back-off timeslot and a second back-off timeslot in the at least two back-off timeslots upon termination of the long inter-frame spacing, respectively;

in cases that the first back-off timeslot expires first, the primary audio device obtains a second access right to the feedback channel;

in cases that the second back-off timeslot expires first, the secondary audio device obtains the second access right to the feedback channel.

Preferably, the primary audio device obtaining the second access right to the feedback channel accesses the feedback channel upon expiry of the first back-off timeslot so as to transmit the first ACK feedback packet to the audio source device in the next preset time interval, such that the audio source device transmits new audio data;

or, the secondary audio device obtaining the second access right to the feedback channel accesses the feedback channel upon expiry of the second back-off time slot so as to transmit the second ACK feedback packet to the audio source device in the next preset time interval, such that the audio source device transmits new audio data.

Preferably, start time of the short inter-frame spacing and start time of the long inter-frame spacing are both start time of the idle time interval, and end time of the short inter-frame spacing is earlier than end time of the long inter-frame spacing;

start time of the contention window is end time of the long inter-frame spacing, and end time of the contention window is end time of the idle time interval.

In another aspect, embodiments of the present disclosure further provide a wireless audio system, comprising: an audio source device and dual-channel wireless audio equipment; wherein the dual-channel wireless audio equipment adopts the audio data communication method described above.

Compared with conventional technologies, the present disclosure offers at least one of the following advantages:

Embodiments of the present disclosure provide an audio data communication method and a wireless audio system, wherein the primary audio device and the secondary audio device may transmit the corresponding first feedback information or second feedback information to the audio source device based on the Carrier Sense Multiple Access/Collision Avoidance CSMA/CA protocol, thereby effectively resolving issues in conventional technologies such as information interaction between the primary audio device and the secondary audio device when transmitting the feedback information, and operation complexity.

In the present disclosure, the first NACK feedback packet and the second NACK feedback packet are assigned the same transport priority which is a high transport priority, and the first ACK feedback packet and the second ACK feedback packet are assigned the same transport priority which is a low transport priority; the transport priorities of to-be-transmitted feedback packets may be sorted based on the CSMA/CA protocol, such that the primary audio device and the secondary audio device may contend to access the feedback channel based on the transport priorities corresponding to their respective feedback packets, thereby avoiding information interaction between the primary audio device and the secondary audio device and offering implementation feasibility and operation convenience.

In the present disclosure, in cases that the NACK feedback packet and the ACK feedback packet are simultaneously present, the audio device corresponding to the NACK feedback packet may obtain the first access right to the feedback channel and immediately access the feedback channel upon termination of the short inter-frame spacing, thereby being capable of transmitting the NACK feedback packet to the audio source device and effectively blocking transmission of the ACK feedback packet, further guaranteeing that the audio source device may accurately receive the NACK feedback packet and retransmit the audio data so as to enhance reliability of audio data transmission.

In the present disclosure, in cases that the first NACK feedback packet and the second NACK feedback packet are simultaneously present, the primary audio device and the secondary audio device may contend for the first access right to the feedback channel by colliding, and the audio device obtaining the first access right to the feedback channel immediately accesses the feedback channel upon termination of the short inter-frame spacing so as to transmit the corresponding NACK feedback packet to the audio source device; meanwhile, the audio source device retransmits the audio data no matter whether it receives the first NACK feedback packet or the second NACK feedback packet, thereby ensuring reliability of audio data transmission.

In the present disclosure, in cases that the first ACK feedback packet and the second ACK feedback packet are simultaneously present, the primary audio device and the secondary audio device may preemptively occupy the first back-off timeslot and the second back-off timeslot upon termination of the long inter-frame spacing, respectively, wherein the audio device whose back-off timeslot expires first may obtain the second access right to the feedback channel and immediately access the feedback channel upon expiry of the selected back-off timeslot so as to transmit the corresponding ACK feedback packet to the audio source device; meanwhile, the audio source device retransmits the audio data no matter whether it receives the first NACK feedback packet or the second NACK feedback packet, thereby ensuring reliability of audio data transmission.

In the present disclosure, in cases that none of the first ACK feedback packet, the second ACK feedback packet, the first NACK feedback packet, and the second NACK feedback packet is received by the audio source device, it still retransmits the audio data so as to ensure reliability of audio data transmission.

DETAILED DESCRIPTION

Hereinafter, an audio data communication method and a wireless radio system provided by the present disclosure will be further explained with reference to the accompanying drawings and preferred embodiments. Advantages and features of the present disclosure will become more apparent through the following description. It is noted that the drawings are simplified and illustrated in a non-precision scale, which are only intended for facilitating convenient and clear illustration of the embodiments of the present disclosure. The accompanying drawings are referenced to make the objectives, features, and advantages of the present disclosure much clearer and more comprehensible. It is noted that the structures, scales, and sizes illustrated in the accompanying drawings are only used for cooperating with the disclosure in the description for those skilled in the art to understand and read, not intended for limiting the conditions for implementing the present disclosure, such that they do not have substantive technical implications. No structural modifications, proportional variations or size adjustments do not affect the effects generated by the present disclosure or the objectives achieved thereby; instead, such modifications, variations or adjustments shall still fall within the scope of the present disclosure.

It is noted that in the present disclosure, the relational terms such as first and second are only used for distinguishing one entity or operation from another entity or operation, not necessarily requiring or implying that these entities or operations have any such actual relation or sequence. Moreover, It is also noted that the terms "include," "comprise" or any other variables intend for a non-exclusive inclusion, such that a process, a method, a product or a system including a series of elements not only includes those elements, but also includes other elements that are not explicitly specified or further includes the elements inherent in the process, method, product or system. Without more restrictions, an element limited by the phase "including one . . . " does not exclude presence of further equivalent elements in the process, method, product or system including the elements.

Figure 1:
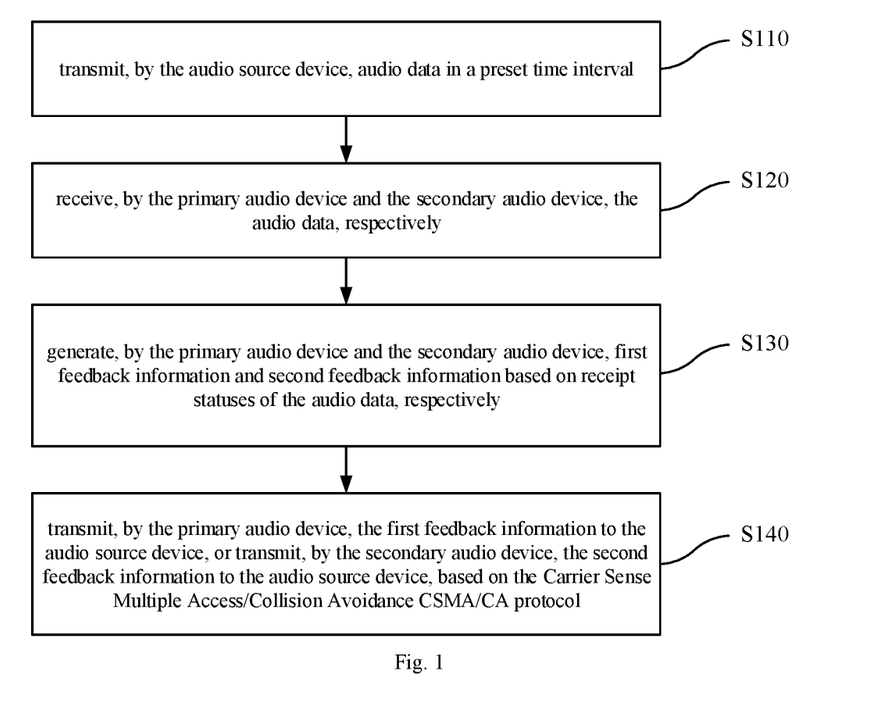
FIG. 1 is a flow diagram of an audio data communication method provided according to an embodiment of the present disclosure.
Figure 2:
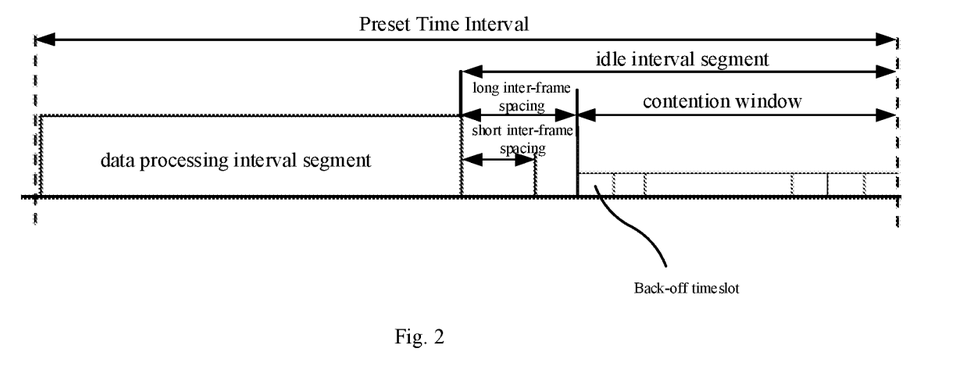
FIG. 2 is a diagram of dividing an idle time interval in an audio data communication method according to an embodiment of the present disclosure.
Figure 3:
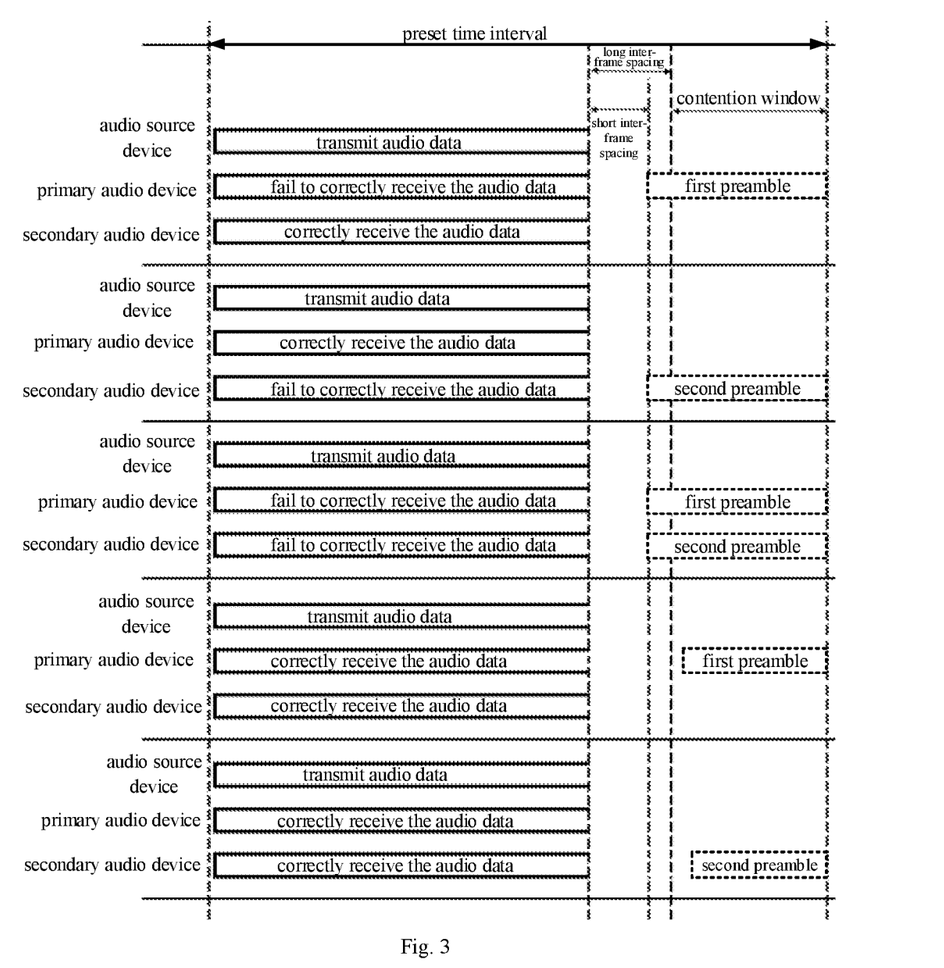
FIG. 3 is a time sequence diagram of accessing a feedback channel in an audio data communication method according to an embodiment of the present disclosure.

As illustrated in FIGS. 1~3, the embodiment provides an audio data communication method applied to dual-channel wireless audio equipment, the dual-channel wireless audio equipment including a primary audio device and a secondary audio device, a communication link being provided between the primary audio device and an audio source device, wherein the audio data communication method comprises: step S110: transmitting, by the audio source device, audio data in a preset time interval; step S120: receiving, by the primary audio device and the secondary audio device, the audio data, respectively; step S130: generating, by the primary audio device and the secondary audio device, first feedback information and second feedback information based on receipt statuses of the audio data, respectively; and step S140: transmitting, by the primary audio device, the first feedback information to the audio source device, or transmitting, by the secondary audio device, the second feedback information to the audio source device, based on the Carrier Sense Multiple Access/Collision Avoidance CSMA/CA protocol.

Please continue referring to FIG. 1. The step S120 comprises: receiving, by the primary audio device, the audio data via the communication link, and sensing, by the secondary audio device, the communication link to obtain the audio data.

Specifically, in this embodiment, the communication link may be a Bluetooth protocol-based standard link; an additional wireless link may be provided between the primary audio device and the secondary audio device, such that the secondary audio device may obtain the communication information such as Bluetooth parameter and clock of the communication link via the wireless link; in this way, the secondary audio device can sense the communication link based on the communication information and further obtain the audio data transmitted by the audio source device. Preferably, the wireless link may refer to a Bluetooth protocol-based standard link; however, the present disclosure is not limited hereto.

Meanwhile, please refer to FIG. 1, the first feedback information includes a first ACK feedback packet and a first NACK feedback packet; and in cases of correctly receiving the audio data, the primary audio device generates the first ACK feedback packet, and otherwise, generates the first NACK feedback packet; the second feedback information includes a second ACK feedback packet and a second NACK feedback packet; and in cases of correctly receiving the audio data, the secondary audio device generates the second ACK feedback packet, and otherwise, generates the second NACK feedback packet.

It is understood that, in some other embodiments, the first ACK feedback packet and the second ACK feedback packet are assigned a same transport priority which is a low transport priority; the first NACK feedback packet and the second NACK feedback packet are assigned a same transport priority which is a high transport priority.

Specifically, in this embodiment, if both of the primary audio device and the secondary audio device correctly receive the audio data in step S130, it indicates that the audio data transmission succeeds, and then the audio source device may transmit new audio data in the next preset time interval. If either of the primary audio device and the secondary audio device fails to correctly receive the audio data, it indicates that the audio data transmission fails, and then the audio source device may transmit the audio data in the next preset time interval till the audio data is successfully transmitted, thereby ensuring reliability of the audio data transmission; however, the present disclosure is not limited hereto.

Please continue referring to FIG. 1. The step S140 comprises: establishing a feedback channel for the primary audio device and the secondary audio device; contending, by the primary audio device and the secondary audio device, for the feedback channel based on the CSMA/CA protocol in accordance with the transport priorities corresponding to the first feedback information and the second feedback information, so as to obtain an access right to the feedback channel; and; accessing, by the primary audio device, the feedback channel based on the access right to the feedback channel so as to transmit the first feedback information to the audio source device, or accessing, by the secondary audio device, the feedback channel based on the access right to the feedback channel so as to transmit the second feedback information to the audio source device.

Specifically, in this embodiment, transport priorities of the to-be-transmitted feedback packets may be sorted based on the CSMA/CA protocol, such that the primary audio device and the secondary audio device may contend to access the feedback channel based on the transport priorities corresponding to the respective to-be-transmitted feedback packets, thereby avoiding information interaction between the primary audio device and the secondary audio device, offering implementation feasibility and operation convenience to effectively reduce power consumption of the primary audio device and the secondary audio device. However, the present disclosure is not limited hereto.

Please refer to FIG. 1, FIG. 2, and FIG. 3 simultaneously. The preset time interval includes a data processing time interval and an idle time interval; in the data processing time interval, the audio source device transmits the audio data, and the primary audio device and the secondary audio device receive the audio data and generate the first feedback information and the second feedback information, respectively; in the idle time interval, the primary audio device and the secondary audio device contend to access the feedback channel.

It is understood that in some other embodiments, before executing the step where the primary audio device and the secondary audio device contend for the feedback channel to obtain an access right to the feedback channel further comprises: dividing the idle time interval into a short inter-frame spacing, a long inter-frame spacing, and a contention window; and dividing the contention window into at least two back-off timeslots.

In some embodiments, start time of the short inter-frame spacing and start time of the long inter-frame spacing are both start time of the idle time interval, and the start time of the short inter-frame spacing is earlier than end time of the long inter-frame spacing; and start time of the contention window is the end time of the long inter-frame spacing, and end time of the contention window is end time of the idle time interval.

Specifically, in this embodiment, start time of the data processing time interval may be start time of the preset time interval, end time of the data processing time interval may be the start time of the idle time interval, end time of the idle time interval may be end time of the preset time interval; the length of the data processing time interval may be a variable length, variable with the size or length of the audio data; the length of the audio data; while the length of the idle time interval may be a fixed length. However, the present disclosure is not limited hereto.

Specifically, in this embodiment, length of the short inter-frame spacing in the idle time interval is less than length of the long inter-frame spacing, and in the short inter-frame spacing, the primary audio device and the secondary audio device may complete a switch from the receive state to the transmit state. To ensure that a feedback packet with a high transport priority may be transmitted first, the audio device corresponding to the feedback packet with a high transport priority immediately accesses the feedback channel upon termination of the short inter-frame spacing, such that the feedback channel comes to an occupied state, thereby effectively blocking transmission of the feedback packet with a low transport priority, further ensuring that the audio source device may accurately receive the feedback packet with a high transport priority. However, the present disclosure is not limited hereto.

Please continue referring to FIG. 3. In cases that the first feedback information refers to the first NACK feedback packet with a high transport priority and the second feedback information refers to the second ACK feedback packet with a low transport priority, the primary audio device obtains a first access right to the feedback channel; incases that the first feedback information refers to the first ACK feedback packet with a low transport priority and the second feedback information refers to the second NACK feedback packet with a high transport priority, the secondary audio device obtains the first access right to the feedback channel; in cases that the first feedback information refers to the first NACK feedback packet with a high transport priority and the second feedback information refers to the second NACK feedback packet with a high transport priority, the primary audio device and the secondary audio device contend for the first access right to the feedback channel by colliding.

It is understood that in some alternative embodiments, the primary audio device obtaining the first access right to the feedback channel accesses the feedback channel upon termination of the short inter-frame spacing so as to transmit the first NACK feedback packet to the audio source device in the next preset time interval, such that the audio source device retransmits the audio data; or, the secondary audio device obtaining the first access right to the feedback channel accesses the feedback channel upon termination of the short inter-frame spacing so as to transmit the second NACK feedback packet to the audio source device in the next preset time interval such that the audio source device retransmits the audio data.

Specifically, a first circumstance of this embodiment is as such: the primary audio device does not correctly receive the audio data, while the secondary audio device correctly receives the audio data. In this circumstance, the primary audio device generates the first NACK feedback packet, and the secondary audio device generates the second ACK feedback packet; as the transport priority of the first NACK feedback packet is higher than that of the second ACK feedback packet, the primary audio device may obtain the first access right to the feedback channel, and upon termination of the short inter-frame spacing, the primary audio device immediately transmits a first preamble to the audio source device till termination of the idle time interval, such that the primary audio device continuously accesses the feedback channel till termination of the idle time interval, thereby effectively blocking transmission of the second ACK feedback packet. Upon termination of the idle time interval, i.e., at the start of the next preset time interval, the primary audio device terminates transmission of the first preamble and transmits the first NACK feedback packet to the audio source device, such that the audio source device may accurately receive the first NACK feedback packet and retransmit the audio data, thereby ensuring reliability of audio data transmission. However, the present disclosure is not limited hereto.

Specifically, a second circumstance of this embodiment is as such: the primary audio device correctly receives the audio data, while the secondary audio device fails to correctly receive the audio data. In this circumstance, the primary audio device generates the first ACK feedback packet, and the secondary audio device generates the second NACK feedback packet; as the transport priority of the first ACK feedback packet is higher than that of the second NACK feedback packet, the secondary audio device may obtain the first access right to the feedback channel and upon termination of the short inter-frame spacing, the secondary audio device immediately transmits a second preamble to the audio source device till termination of the idle time interval, such that the secondary audio device continuously accesses the feedback channel till termination of the idle time interval, thereby effectively blocking transmission of the first ACK feedback packet. Upon termination of the idle time interval, i.e., at the start of the next preset time interval, the secondary audio device terminates transmission of the second preamble and transmits the second NACK feedback packet to the audio source device, such that the audio source device may accurately receive the second NACK feedback packet and retransmit the audio data, thereby ensuring reliability of audio data transmission. However, the present disclosure is not limited hereto.

Specifically, a third circumstance of this embodiment is as such: neither the primary audio device nor the audio device correctly receives the audio data. In this circumstance, the primary audio device generates the first NACK feedback packet, and the secondary audio device generates the second NACK feedback packet. As the first NACK feedback packet and the second NACK feedback packet are assigned the same transport priority which is a high transport priority, the primary audio device and the secondary audio device simultaneously transmit the first preamble and the second preamble to the audio source device, causing the first preamble and the second preamble to collide; if a collision result is that the first preamble is successfully transmitted to the audio source device, it indicates that the primary audio device obtains the first access right to the feedback channel and accesses the feedback channel; and upon termination of the idle time interval, i.e., at the start of the next preset time interval, the primary audio device terminates transmission of the first preamble and transmits the first NACK feedback packet to the audio source device; if a collision result is that the second preamble is successfully transmitted to the audio source device, it indicates that the secondary audio device obtains the first access right to the feedback channel and accesses the feedback channel; and upon termination of the idle time interval, i.e., at the start of the next preset time interval, the secondary audio device terminates transmission of the second preamble and transmits the second NACK feedback to the audio source device. The audio source device retransmits the audio data no matter whether the first NACK feedback packet or the second NACK feedback packet is received, thereby ensuring reliability of audio data transmission. However, the present disclosure is not limited hereto.

Please continue referring to FIG. 3. In cases that the first feedback information refers to the first ACK feedback packet with a low transport priority and the second feedback information refers to the second ACK feedback packet with a low transport priority, the primary audio device and the secondary audio device preemptively occupy the first back-off timeslot and the second back-off timeslot in the at least two back-off timeslots upon termination of the long inter-frame spacing, respectively; if the first back-off timeslot expires first, the primary audio device obtains a second access right to the feedback channel; and if the second back-off timeslot expires first, the secondary audio device obtains the second access right to the feedback channel.

It is understood that in some alternative embodiments, the primary audio device obtaining the second access right to the feedback channel accesses the feedback channel upon expiry of the first back-off timeslot so as to transmit the first ACK feedback packet to the audio source device in the next preset time interval, such that the audio source device transmits new audio data; or, the secondary audio device obtaining the second access right to the feedback channel accesses the feedback channel upon expiry of the second back-off timeslot so as to transmit the second ACK feedback packet to the audio source device in the next preset time interval, such that the audio source device transmits new audio data.

Specifically, in this embodiment, in cases that both of the primary audio device and the secondary audio device correctly receive the audio data, the primary audio device generates the first ACK feedback packet, and the secondary audio device generates the second ACK feedback packet. As the first ACK feedback packet and the second ACK feedback packet are assigned the same transport priority which is a low transport priority, the primary audio device may preemptively occupy the first back-off timeslot upon termination of the long inter-frame spacing, while the secondary audio device may preemptively occupy the second back-off timeslot. This leads to a fourth circumstance: the first back-off timeslot expires first. In this circumstance, the primary audio device may obtain the second access right to the feedback channel, and upon expiry of the first back-off timeslot, the primary audio device immediately transmits the first preamble to the audio source device till termination of the idle time interval, such that the primary audio device continuously accesses the feedback channel till termination of the idle time slot, thereby effectively blocking transmission of the second ACK feedback packet; upon termination of the idle time interval, i.e., at the start of the next preset time interval, the primary audio device terminates transmission of the first preamble and transmits the first ACK feedback packet to the audio source device. A fifth circumstance also arises: the second back-off timeslot expires first. In this circumstance, the secondary audio device may obtain the second access right to the feedback channel, and upon expiry of the second back-off timeslot, the secondary audio device immediately transmits the second preamble to the audio source device till termination of the idle time interval, such that the secondary audio device continuously accesses the feedback channel till termination of the idle time interval, thereby effectively blocking transmission of the first ACK feedback packet; upon termination of the idle time interval, i.e., at the start of the next preset time interval, the secondary audio device terminates transmission of the second preamble and transmits the second ACK feedback packet to the audio source device. The audio source device transmits new audio data in the next preset time interval no matte whether the first ACK feedback packet or the second ACK feedback is received. However, the present disclosure is not limited hereto.

In addition, in this embodiment, if none of the first ACK feedback packet, the second ACK feedback packet, the first NACK feedback packet, and the second NACK feedback packet is received by the audio source device, it retransmits the audio data in the next preset time interval, thereby ensuring reliability of audio data transmission. However, the present disclosure is not limited hereto.

In another aspect of the present disclosure, there is provided a wireless audio system, comprising: an audio source device and dual-channel wireless audio equipment; wherein the dual-channel wireless audio equipment adopts the audio data communication method described above.

In view of the above, embodiments of the present disclosure provide an audio data communication method and a wireless audio system, wherein the audio source device may transmit audio data within a preset time interval; the primary audio device and the secondary audio device may receive the audio data, and generate first feedback information and second feedback information based on receipt statuses of the audio data, respectively; based on the Carrier Sense Multiple Access/Collision Avoidance CSMA/CA protocol, the primary audio device and the secondary audio device may transmit the corresponding first feedback information or second feedback information to the audio source device, thereby effectively resolving issues in conventional technologies such as information interaction between the primary audio device and the secondary audio device when transmitting the feedback information, and operation complexity. In the present disclosure, the first NACK feedback packet and the second NACK feedback packet are assigned the same transport priority which is a high transport priority, and the first ACK feedback packet and the second ACK feedback packet are assigned the same transport priority which is a low transport priority; transport priorities of the to-be-transmitted feedback packets may be sorted based on the CSMA/CA protocol, such that the primary audio device and the secondary audio device may contend to access the feedback channel based on the transport priorities corresponding to their respective feedback packets, thereby avoiding information interaction between the primary audio device and the secondary audio device, offering implementation feasibility and operation convenience.

Although the contents of the present disclosure have been described in detail through the foregoing preferred embodiments, it should be understood that the depictions above shall not be regarded as limitations to the present disclosure. After those skilled in the art having read the contents above, many modifications and substitutions to the present disclosure are all obvious. Therefore, the protection scope of the present disclosure should be limited by the appended claims.

I claim:

1. An audio data communication method applied to dual-channel wireless audio equipment, the dual-channel wireless audio equipment including a primary audio device and a secondary audio device, a communication link being provided between the primary audio device and an audio source device, wherein the audio data communication method comprises steps of:
    transmitting, by the audio source device, audio data in a preset time interval;
    receiving, by the primary audio device and the secondary audio device, the audio data, respectively;
    generating, by the primary audio device and the secondary audio device, first feedback information and second feedback information based on receipt statuses of the audio data, respectively; and
    transmitting, by the primary audio device, the first feedback information to the audio source device, or transmitting, by the secondary audio device, the second feedback information to the audio source device, based on Carrier Sense Multiple Access/Collision Avoidance CSMA/CA protocol.

2. The audio data communication method according to claim 1, wherein the step of receiving, by the primary audio device and the secondary audio device, the audio data, respectively, comprises:
    receiving, by the primary audio device, the audio data via the communication link; and
    sensing, by the secondary audio device, the communication link to obtain the audio data.

3. The audio data communication method according to claim 1, wherein:
    The first feedback information includes a first acknowledgement ACK feedback packet and a first negative acknowledgement NACK feedback packet; and
    in cases of correctly receiving the audio data, the primary audio device generates the first acknowledgement ACK feedback packet, and otherwise, generates the first negative acknowledgement NACK feedback packet;
    the second feedback information includes a second acknowledgement ACK feedback packet and a second negative acknowledgement NACK feedback packet; and
    in cases of correctly receiving the audio data, the secondary audio device generates the second acknowledgement ACK feedback packet, and otherwise, generates the second negative acknowledgement NACK feedback packet.

4. The audio data communication method according to claim 3, wherein:
    the first acknowledgement ACK feedback packet and the second acknowledgement ACK feedback packet are assigned a same transport priority which is a low transport priority;
    the first negative acknowledgement NACK feedback packet and the second negative acknowledgement NACK feedback packet are assigned a same transport priority which is a high transport priority.

5. The audio data communication method according to claim 4, wherein:
    the step of transmitting, by the primary audio device, the first feedback information to the audio source device, or transmitting, by the secondary audio device, the second feedback information to the audio source device, based on Carrier Sense Multiple Access/Collision Avoidance CSMA/CA protocol, comprises:
  establishing a feedback channel for the primary audio device and the secondary audio device;
  contending, by the primary audio device and the secondary audio device, for the feedback channel based on the Carrier Sense Multiple Access/Collision Avoidance CSMA/CA protocol in accordance with the transport priorities corresponding to the first feedback information and the second feedback information, thereby obtaining an access right to the feedback channel; and
  accessing, by the primary audio device, the feedback channel based on the access right to the feedback channel so as to transmit the first feedback information to the audio source device, or accessing, by the secondary audio device, the feedback channel based on the access right to the feedback channel so as to transmit the second feedback information to the audio source device.

6. The audio data communication method according to claim 5, wherein
  the preset time interval includes a data processing time interval and an idle time interval;
  in the data processing time interval, the audio source device transmits the audio data, and the primary audio device and the secondary audio device receive the audio data and generate the first feedback information and the second feedback information, respectively; and
  in the idle time interval, the primary audio device and the secondary audio device contend to access the feedback channel.

7. The audio data communication method according to claim 6, wherein before executing the step of contending, by the primary audio device and the secondary audio device, for the feedback channel so as to obtain an access right to the feedback channel, the audio data communication method further comprises steps of:
  dividing the idle time interval into a short inter-frame spacing, a long inter-frame spacing, and a contention window; and
  dividing the contention window into at least two back-off timeslots.

8. The audio data communication method according to claim 7, wherein:
  in cases that the first feedback information refers to the first negative acknowledgement NACK feedback packet with a high transport priority and the second feedback information refers to the second acknowledgement ACK feedback packet with a low transport priority, the primary audio device obtains a first access right to the feedback channel;
  in cases that the first feedback information refers to the first acknowledgement ACK feedback packet with a low transport priority and the second feedback information refers to the second negative acknowledgement NACK feedback packet with a high transport priority, the secondary audio device obtains the first access right to the feedback channel; and
  in cases that the first feedback information refers to the first negative acknowledgement NACK feedback packet with a high transport priority and the second feedback information refers to the second negative acknowledgement NACK feedback with a high transport priority, the primary audio device and the secondary audio device contend for the first access right by colliding.

9. The audio data communication method according to claim 8, wherein:
  the primary audio device obtaining the first access right to the feedback channel accesses the feedback channel upon termination of the short inter-frame spacing so as to transmit the first negative acknowledgement NACK feedback packet to the audio source device in the next preset time interval, such that the audio source device retransmits the audio data; or,
  the secondary audio device obtaining the first access right to the feedback channel accesses the feedback channel upon termination of the short inter-frame spacing so as to transmit the second negative acknowledgement NACK feedback packet to the audio source device in the next preset time interval, such that the audio source device retransmits the audio data.

10. The audio data communication method according to claim 7, wherein:
  in cases that the first feedback information refers to the first acknowledgement ACK feedback packet with a low transport priority and the second feedback information refers to the second acknowledgement ACK feedback packet with a low transport priority, the primary audio device and the secondary audio device contend for a first back-off timeslot and a second back-off timeslot in the at least two back-off timeslots upon termination of the long inter-frame spacing, respectively;
  in cases that the first back-off timeslot expires first, the primary audio device obtains a second access right to the feedback channel; and
  in cases that the second back-off timeslot expires first, the secondary audio device obtains the second access right to the feedback channel.

11. The audio data communication method according to claim 10, wherein:
  the primary audio device obtaining the second access right to the feedback channel accesses the feedback channel upon expiry of the first back-off timeslot so as to transmit the first acknowledgement ACK feedback packet to the audio source device in the next preset time interval, such that the audio source device transmits new audio data; or,
  the secondary audio device obtaining the second access right to the feedback channel accesses the feedback channel upon expiry of the second back-off time slot so as to transmit the second acknowledgement ACK feedback packet to the audio source device in the next preset time interval, such that the audio source device transmits new audio data.

12. The audio data communication method according to claim 7, wherein:
  start time of the short inter-frame spacing and start time of the long inter-frame spacing are both start time of the idle time interval, and end time of the short inter-frame spacing is earlier than end time of the long inter-frame spacing; and
  start time of the contention window is end time of the long inter-frame spacing, and end time of the contention window is end time of the idle time interval.

13. A wireless audio system, comprising: an audio source device and dual-channel wireless audio equipment; wherein the dual-channel wireless audio equipment is configured to perform the audio data communication method according to claim 1.

* * * * *